United States Patent [19]
Peterson

[11] 3,933,632
[45] Jan. 20, 1976

[54] REMOVAL OF IMMISCIBLE FLUIDS FROM WATER SURFACES AND LAKE BEDS

[75] Inventor: Earl C. Peterson, Minneapolis, Minn.

[73] Assignee: Electrolysis Pollution Control Inc., Minneapolis, Minn.

[22] Filed: June 7, 1974

[21] Appl. No.: 477,276

Related U.S. Application Data

[63] Continuation-in-part of Ser. No. 362,317, May 21, 1973, abandoned, which is a continuation-in-part of Ser. No. 296,789, Oct. 12, 1972, abandoned, which is a continuation-in-part of Ser. No. 143,713, May 26, 1971, abandoned.

[52] U.S. Cl. .............. 210/36; 210/40; 210/DIG. 21
[51] Int. Cl.² ............................................ C02B 9/02
[58] Field of Search .......... 210/36, 40, 41, DIG. 21, 210/39, 42, 46

[56] References Cited
UNITED STATES PATENTS

| | | | |
|---|---|---|---|
| 3,382,170 | 5/1968 | Pape | 210/40 X |
| 3,414,511 | 12/1968 | Hitzman | 210/40 |
| 3,556,698 | 1/1971 | Tully et al. | 210/40 X |
| 3,562,153 | 2/1971 | Tully et al. | 210/36 |
| 3,589,844 | 6/1971 | Kraemer | 210/40 X |
| 3,749,667 | 7/1973 | Lindstrom | 210/36 |

FOREIGN PATENTS OR APPLICATIONS

| | | | |
|---|---|---|---|
| 1,315,980 | 12/1962 | France | 210/DIG. 21 |
| 573,408 | 11/1945 | United Kingdom | 210/36 |

*Primary Examiner*—Thomas G. Wyse
*Attorney, Agent, or Firm*—Orrin M. Haugen

[57] ABSTRACT

A method of removing immiscible fluids such as oil spills from the surface of bodies of water which comprises placing an adsorbant compound on the water surface in contact with the immiscible fluid and maintaining contact between the surface of the immiscible fluid and the adsorbant material until the immiscible fluid is adsorbed. The adsorbant compound consists of an admixture comprising from between about 30% and 70% by weight of lead slag mineral wool, with the balance being a finely divided natural stone substance containing substantial quantities of iron, aluminum, and magnesium oxides, including such natural stones as trap rock, basalt and gabbro. The lead slag mineral wool is treated with a hydrophobic-oil-soluble hydrocarbon chain substance, such as oleic acid to wet the surface of the mineral wool prior to mixing with stone flour. The lead slag mineral wool is preferably fragmented into nodules having a diameter of, for example, from ½ inch to 1 inch. The composition may be also utilized for removing oil spills from lake beds or soil surfaces.

5 Claims, No Drawings

REMOVAL OF IMMISCIBLE FLUIDS FROM WATER SURFACES AND LAKE BEDS

CROSS-REFERENCE TO RELATED APPLICATIONS

The present application is a continuation-in-part of my co-pending application Ser. No. 362,317, filed May 21, 1973, entitled "Removal of Immiscible Fluids from Water Surfaces and Lake Beds." now abandoned, which application was a continuation-in-part of application Ser. No. 296,789, filed Oct. 12, 1972, now abandoned, this application being a continuation-in-part of a still earlier co-pending application Ser. No. 143,713, filed May 26, 1971, now abandoned.

BACKGROUND OF THE INVENTION

The present invention relates generally to an improved method of removing immiscible fluids such as oil slicks from the surface of bodies of water or beds, and more specifically to a technique for removing oils such as crude or refined oil, gasoline, or the like from these surfaces including water surfaces in order to avoid or reduce pollution of the water. In the past, various techniques and materials have been utilized for providing an adsorbant compound for the water, however these adsorbants have frequently been found to be ineffective in permanent removal of the pollutant, or have frequently contributed to pollution on their own. The concept of the present invention provides a means for removing pollutants and effectively retaining these materials over extended periods of time, without contributing to the pollution of the water by incorporation of undesirable materials in the adsorbant compound. Also, an effective means of mixing the component materials is provided.

SUMMARY OF THE INVENTION

Briefly, the primary feature or concept of the present invention provides for the removal of immiscible fluids by placing an adsorbant compound on the surface of the water. The adsorbant compound is an admixture of compacted lead slag mineral wool coated with a hydrophobic oil soluble film such as oleic acid, and between about 30% and 70% by weight of a finely divided natural stone containing substantial quantities of the oxides of iron, aluminum and magnesium may be added, such as, for example, trap rock, basalt or gabbro. Trap rock is generally preferred. Basalt is an Apanitic rock, while gabbro is a Plutonic rock, and all substances are, of course, readily available.

The composition of the adsorbant compound is one which does not contribute to biological oxygen demand in the water being treated. The substances are highly inert, and are utilized for their highly adsorbant characteristics. The rate of adsorption is high, and the retention of adsorbed oily materials has also been found to be unusually high. In other words, an oil slick may be removed from the surface of a body of water by broadcasting the adsorbant compound upon the surface of the water, and this oil slick will remain tightly adsorbed by the material over extended periods of time. Inasmuch as the adsorbant compound is inert, the net affect is a reduction in the extent of pollution of the body of water. The component materials are preferably mixed together in a closed tumbler.

The adsorbant compound of the present invention has been found to have a high affinity for oils such as crude or refined petroleum oils and the like. The substance will take up or adsorb substantial quantities of oil from a water surface, with the quantities adsorbed being extremely high relative to the weight or volume of the adsorbant compound.

The composition provides a means for cleaning up oil or other chemicals which constitute immiscible fluids which have been discharged into bodies of surface water. There appears to be an unusually strong bond or attraction between the oil film and the treated or coated mineral wool. The physical characteristics of the adsorbant treated lead slag mineral wool and rock flour are such that the materials may be placed into contact with the oil spill, and later skimmed off the surface of the water prior to complete immersion of the adsorbant material. The coated or treated mineral wool assists in maintaining the material buoyant over extended periods of time. In certain instances, however, it may be desirable or expedient to permit the adsorbant material to remain on the water surface for an extended period of time and permitted to ultimately settle to the bottom of the body of water while retaining the adsorbed pollutants.

Therefore, it is a primary object of the present invention to provide an improved method for removing immiscible fluids from the surfaces of bodies of water which includes placing an adsorbant compound on the water surface, the adsorbant compound consisting of an admixture of compositions which do not in themselves contribute to pollution of the water body.

It is yet a further object of the present invention to provide an improved method for removing immiscible fluids from the surface of bodies of water which includes placing an adsorbant compound on the water surface, wherein the adsorbant compound consists of an admixture of from between about 30% and 70% by weight of lead slag mineral wool coated with an oil-soluble hydrophobic film.

It is yet a further object of the present invention to provide an improved material for adsorbing immiscible fluids from the surfaces of bodies of water which includes an admixture of hydrophobic film coated lead slag mineral wool pellets and a finely divided inert rock or stone containing substantial quantities of the oxides of iron, aluminum, and magnesium.

Other and further objects of the present invention will become apparent to those skilled in the art upon a study of the following specification and appended claims.

DESCRIPTION OF THE PREFERRED EMBODIMENT

As has been indicated, the adsorbant compound utilized in the present invention includes an admixture of from about 30% to about 70% by weight of lead slag mineral wool, balance rock flour. It has been found most desirable to employ from between about 45%–55% lead slag mineral wool, balance rock flour. Certain applications of the adsorbant compound may dictate variations in the quantity, however for most oil spills on bodies of water, the admixture of 50% lead slag mineral wool, balance rock flour has been found to be optimum. In order to enhance the capability of the substance to adsorb and retain water immiscible fluids, a quantity of finely divided trap rock material or powder or other natural stone rich in the oxides of iron, aluminum and magnesium is added. Best results have been obtained through the addition of a material selected from the group consisting of basalt and gabbro. This material is preferably added in finely divided form, such as in the form of finely divided particles of 50 mesh or smaller.

The lead slag mineral wool is commercially available. This material is a by-product of lead smelting, and normally contains high metal oxide content. There appears to be a reasonable attraction between oils and lead slag mineral wool, this affinity being believed to contribute to the retention of the oil by the mineral wool. The application of the film of oil soluble-hydrophobic material to the lead slag wool enhances the affinity of the material for oil. Also, prior to mixing with rock flour, the lead slag mineral wool is preferably passed through a hammer mill or silage cutter in order to compress the material into fragments or nodules approximately ½ inch to 1 inch in diameter.

The mineral wool is treated with a material so as to render the surface coated with a film of oil soluble hydrophobic material. Preferably, oleic acid is used to form this film, it being understood, however, that other fatty acids may be utilized, preferably those having from between 16 and 22 carbon atoms. Since the most abundant acids have 16 or 18 carbon atoms in the chain, and these are commercially available, they become more useful for the present concept. In this connection, the acids of the group consisting of palmitic, stearic, oleic, linoleic, linolenic, and arachidonic acids may be found useful. Linoleic, linolenic and arachidonic acids are frequently referred to as "essential fatty acids." The acids are normally derived from the glycerides.

In order to prepare the substance for use, one part of the acid is added to approximately 50 parts of water, and the lead slag mineral wool is passed through the liquid until the fibers become damp. The damp fibers are then mixed with the finely divided trap rock flour. This material, following drying, provides an adsorbant material that floats on water surfaces for periods of up to 30 days. During this period, the mixed material has a great affinity for oil and certain other water immiscible materials, and little, if any, affinity for water. The fiber materials appear to act as a matrix which binds and holds the oil into the compressed balls or rolls of wool, and the material can be easily removed from the water surface. The material has been found to be capable of withstanding constant agitation and will normally hold, and retain up to 12 times its weight of oil. The congealed oil matrix material may float for periods of up to 30 days. Wave action may provide agitation of the material in oily waters, which tends to be helpful in expediting adsorption.

It has been found that the fatty acids selected from the group consisting of palmitic, stearic, oleic, linoleic, linolenic, and arachidonic acids are equally suited to the concept. They are employed by dispersing the acid in water, preferably distilled water, on a basis of approximately 2% acid, balance water. The lead slag mineral wool is exposed to the acid-water mixture to an extent sufficient to permit the wool to become damp, and therefore substantially coated with the fatty acid upon evaporation of the water.

When materials rich in oxides of iron, aluminum, and magnesium are added, this material may be introduced into the mineral wool while in a hammer mill, or may be physically added prior to use. The technique and nature of the materials permit the finely divided stone material to be conveniently added to the mineral wool.

In actual use, the adsorbant compound is placed upon the surface of the water in contact with the immiscible fluids such as spilled oil or the like. The oil is quickly adsorbed into the surface of the lead slag mineral wool-rock flour mixture.

EXAMPLE 1

500 pounds of lead slag wool was passed through a hammer mill and compressed balls or rolls of the wool were formed. This material was thereafter wetted with a solution of 2% oleic acid in water and permitted to dry.

Thereafter, 500 pounds of basalt, 50 mesh and smaller were added to the lead slag wool and the combination placed within a closed tumbler chamber and tumbled for a period of 10 minutes at a rate of approximately 50 cycles per minute. A butter churn tumbler may be satisfactorily utilized for this purpose. Following tumbling, the material was permitted to settle for 5 minutes within the closed chamber so as to permit the dust to settle and find its way into the intricacies of the lead slag wool.

This material will pick up at least about 10 times its own weight in oil when placed on a water surface containing a superimposed layer of oil, such as petroleum products and the like.

In certain instances, a greater quantity of crushed basalt may be desirable, particularly when the material is to be used to remove thick heavy films of oil from water surfaces. The upper limit of approximately 70% of basalt is felt reasonable in view of the density increase of the material when this quantity is employed, since as the density increases, the material has a more rapid rate of sinking within the area being treated.

For treatment of surface water wherein the bed is impregnated with trapped oil or the like, it has been found that the technique is more effective when applied during periods of rising barometric pressure. The reason for this is unknown, however it has been observed that greater quantities of trapped oil are released from the bed during periods of barometric pressure increase.

TREATMENT EXAMPLE

A mixture of 500 pounds of lead slag wool was passed through a shredder to form compressed lightweight balls, these lightweight balls having a nominal diameter of approximately 1 inch when formed. This material was thereafter wetted with a solution of 2% oleic acid in water, and permitted to dry.

Thereafter, 500 pounds of basalt ground to 50 mesh or smaller was added to the lead slag wool and the combination placed within a 50 gallon drum and tumbled at a rate of 50 revolutions per minute for a period of 10 minutes. Following tumbling, the batch of material was permitted to settle for 5 minutes to permit dusting to cease, and the material was then removed.

This composition is then spread along a shoreline and surface of a lake having no surface outlet at a rate of 100 pounds of the lead slag wool-rock flour per acre.

The material ultimately sinks to the lake bottom, and retains the adsorbed and adsorbed oil film therewithin.

GENERAL DISCUSSION

In another operational concept, the lead slag mineral wool and rock flour mixture may be retained or physically confined within a screen-like enclosure. A coarse mesh screen or the like may be utilized for retention of the adsorbant compound. The structure may then be placed into physical contact with the surface of the body of water, thus permitting the adsorbant material or compound to be more conveniently retrieved.

The operating parameters for this concept are the same as those set forth in the operational example hereinabove. The substance is capable of retaining up to twelve times its weight of oil, and with this parameter in mind, the adsorbant compound is utilized on a weight basis calculated to retain the appropriate quantities of materials.

In a modified form of the concept, the lead slag wool may initially be spread upon the surface of the oil covered water, and thereafter the trap rock screenings may be applied to the lead slag wool, previously dispersed on the water surface.

In certain other applications, particularly where a water level may vary substantially between highs and lows, the mixed fiber material may be dispersed on the shore line where it has been found to adsorb oil which may be retained as a slick on the surface.

In still other applications, trap rock screenings and limestone screenings may be spread sequentially over the lake bottom following oil removal, and this activity has been found to be beneficial on the quality of the water following oil removal.

In still a further embodiment, it may be desirable or expedient to permit the adsorbant material to settle to the bottom of the body of water and remain there for an extended period of time, particularly after it has become loaded with oil, and with the oil being retained therein. In this concept, the material is initially spread on the oil slick and permitted to remain therefor a period of several days, after which an additional quantity of trap rock screenings is spread over the floating mass, in an amount sufficient to sink the mass.

While the precise mechanism is not known, it appears that the placing of metal oxides such as iron, aluminum, or magnesium in a body of water assists in the adsorption of phosphates, nitrates, nitrites, and the like. The compositions appear to function best when large exposed areas or surface areas are available. It appears that the material creates an environment which encourages and speeds bacterial decomposition of the oil and certain other water pollutants.

Typical analyses of materials which have been found particularly useful in connection with the present invention are set forth hereinbelow:

|  | Lead Slag | Basalt |
| --- | --- | --- |
| Si 02 | 38.0 % | 45.90 % |
| Fe2 03 | 20.0 | 14.08 |
| Al2 03 | 7.0 | 17.35 |
| Co 0 | 26.0 | 8.93 |
| Mg 0 | 5.0 | 8.40 |
| Total Alkalis as Na2 0 | 2.0 | — |
| So 3 | 2.0 | 3.88 |

As a further feature of the present invention, it has been found that there are a number of lakes, lagoons, oil ponds, rivers, creeks, boat harbors and the like which have their beds and shore lines saturated with oil and other water immiscible pollutants. For clarifying these areas, it has been found that trap rock screenings may be spread upon the water surfaces, whereupon the larger particles immediately sink, while the finer particles form a temporary white cloud in the water. The screenings preferably have a size ranging from approximately 10 mesh to less than 100 mesh, it being understood that the size range is not critical, but is important from the standpoint of providing a significant surface area for performing the function, with this type of material being readily available at that residue taken from the dust collector of a trap rock crushing operation. This material is known generally as "trap rock flour." The deposit of trap rock screenings of a size of approximately 10 mesh to about 100 mesh has been found to disrupt the oil particles from the lake bed, and permits them to rise to the surface and form a film in a relatively small or confined area. This discharged or released oil film can then be gathered up with the mixed fiber material on the water surface, or it can be permitted to move onto the shore line where it may be adsorbed by the mixed fiber material and trap rock screenings which may have been previously spread on the shore line.

Copper slag mineral wool may be utilized as a substitute for lead slag mineral wool, with this material not having the requirement of being passed through a shredder. It will be appreciated that lead slag wool is preferred as a material, however.

It will be appreciated that various techniques will become apparent to those skilled in the art for accomplishing the aspects of the present invention. Variations in admixture, method of preparing admixtures, and the like may be readily employed.

I claim:
1. The method of removing oil spills from the surface of bodies of water comprising:
    a. placing an adsorbant compound on the water surface and in direct contact with said immiscible fluid and maintaining contact between said immiscible fluid and said adsorbant compound until said immiscible fluid is adsorbed by said adsorbant compound; and
    b. thereafter removing said adsorbant compound and adsorbed material from said water surface;
    c. said adsorbant compound conssiting of an admixture of from between about 30% and 70% by weight of particulate lead slag mineral wool, balance of from between about 70% and 30% rock flour, said lead slag mineral wool having a film of an oil soluble hydrophobic film thereon, said rock flour being selected from the group consisting of trap rock, basalt and gabbro, and having a particle size of up to about 50 mesh.

2. The method as set forth in claim 1 being particularly characterized in that said adsorbant compound consists of an admixture comprising between about 45% and 55% lead slag mineral wool, balance of from between about 55% and 45% rock flour.

3. The method as set forth in claim 1 being particularly characterized in that said adsorbant compound consists of an admixture comprising 50% lead slag mineral wool, balance of 50% rock flour.

4. The method as defined in claim 1 being particularly characterized in that said oil soluble-hydrophobic film is a film of a fatty acid selected from the group consisting of palmitic, stearic, oleic, linoleic, linolenic, and arachidonic acids.

5. The method of removing oil spills from the surface and bed of bodies of water comprising:
    a initially spreading a certain finely divided particulate solid upon the surface of the water, and permitting the composition to settle to the bed surface, said certain particulate solid being selected from the group consisting of trap rock, basalt and gabbro, and having a particle size of up to 50 mesh;

b thereafter placing an adsorbant compound on the water surface in contact with said immiscible fluid and maintaining contact between said immiscible fluid and said adsorbant compound until said immiscible fluid is adsorbed; and c removing said adsorbant compound and adsorbed material from said water surface;

d said adsorbant compound consisting of an admixture comprising from between about 30% and 70% by weight of particulate lead slag mineral wool coated with a film of an oil-soluble-hydrophobic film, balance of from between 70% and 30% rock flour, said rock flour being selected from the group consisting of trap rock, basalt and gabbro, and having a particle size of up to about 50 mesh.

* * * * *